I. J. WEBSTER.
METHOD OF MAKING TIRES.
APPLICATION FILED MAY 14, 1914.

1,161,093.

Patented Nov. 23, 1915.

WITNESSES:
C. F. Polk
Jesse A. Holton

INVENTOR
Ira J. Webster
BY
Duell Warfield & Duell
ATTORNEYS

UNITED STATES PATENT OFFICE.

IRA J. WEBSTER, OF HAVERHILL, MASSACHUSETTS, ASSIGNOR, BY MESNE ASSIGNMENTS, TO RELIANCE A. C. COMPANY, INC., OF NEW YORK, N. Y., A CORPORATION OF NEW YORK.

METHOD OF MAKING TIRES.

1,161,093. Specification of Letters Patent. Patented Nov. 23, 1915.

Application filed May 14, 1914. Serial No. 838,458.

*To all whom it may concern:*

Be it known that I, IRA J. WEBSTER, a citizen of the United States, residing at Haverhill, in the county of Essex and State of Massachusetts, have invented certain new and useful Improvements in Methods of Making Tires, of which the following is a full, clear, and exact description, such as will enable others skilled in the art to which it appertains to make and use the same.

This invention relates to the art of tire construction, and with regard to certain more specific features thereof to a method of manufacturing pneumatic vehicle tires or the like.

One of the objects of the invention is the provision of a simple and practical method of making tires of the "puncture proof" type.

Another object of this invention is to provide an improved method whereby there is produced a tire or inner tube of a high degree of durability and one which is readily adjustable relative to its shoe or outer tube.

It is another object of the invention to provide a simple and otherwise improved method whereby a tire is produced wherein the material of the tread portion may be held constricted or compressed.

It is another object of the invention to provide a method of constructing pneumatic tires rapidly and economically.

Other objects will be in part obvious and in part pointed out hereinafter.

The invention accordingly consists in the several steps and the relation and order of one or more of such steps with relation to each of the others thereof, which will be exemplified in the hereinafter disclosed method, and the scope of the application of which will be indicated in the claims that follow.

Figure 1:
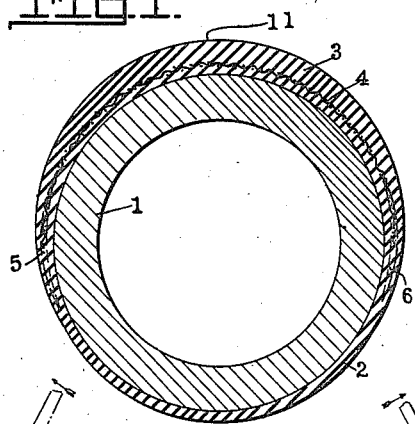
Figure 2:
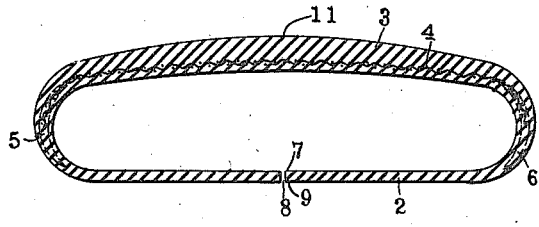
Figure 3:
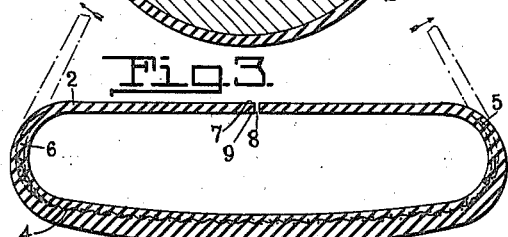
Figure 4:
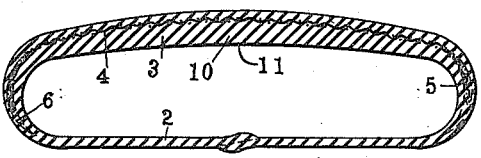
Figure 5:
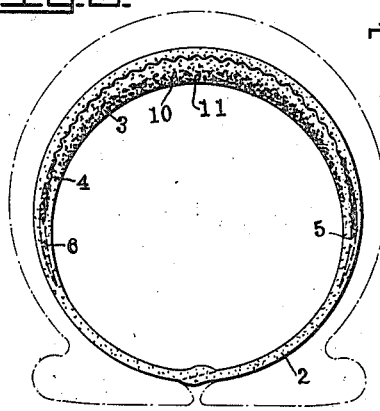
Figure 6:
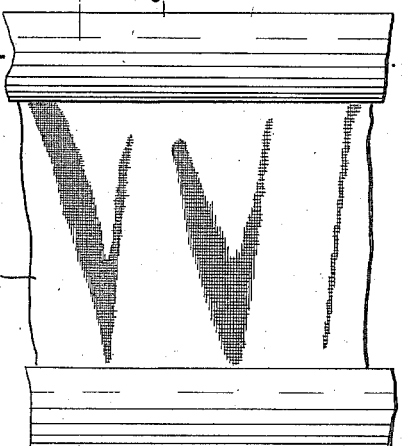
Figure 7:
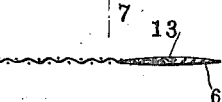
Figure 8:
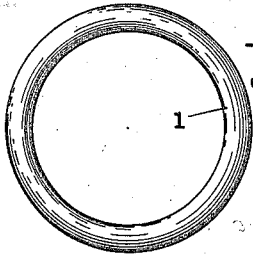

Referring now to the drawings wherein is shown one of the various possible embodiments of the invention, Figure 1 is a view in transverse section of a mandrel having built thereon a tire comprising certain features of the invention; Fig. 2 is a transverse sectional view of the tire shown in Fig. 1, the same being removed from the mandrel; Fig. 3 is a transverse sectional view similar to Fig. 2, showing the position assumed by the tread portion when the whole annular tire member is turned inside out; Fig. 4 is a transverse sectional view showing the position assumed by the tread portion of the tire when the severed edges are lapped together on the reverse side of said tread portion and vulcanized; Fig. 5 is a transverse sectional view showing the tire inflated in its shoe; Fig. 6 is a plan view of a portion of the constricting member; Fig. 7 is a section on the line 7—7 of Fig. 6; Fig. 8 is a view in side elevation of the circular mandrel on which the tire is originally built.

Referring now more particularly to the drawings, wherein similar reference characters refer to similar parts throughout the several views, there is indicated at 1 a continuous circular mandrel, preferably also circular in cross-sectional peripheral shape, an inner tube 2 of rubber or similar material is constructed upon the mandrel 1, and has a tread portion 3 of substantially greater thickness than the remainder of said tube. In the course of the construction of the tube 2 upon the mandrel 1, and before the vulcanizing process, an annular strip 4 of fabric is embedded in the tread portion remote from the outer surface of the tube. The fabric 4 is provided along its edges with strain resisting members 5 and 6, the specific construction and purposes of which will be hereinafter described.

After the tube 2 has been properly formed with the constricting strip 4 properly embedded in the tread portion the whole is vulcanized, and after the vulcanizing process the tube is slit circumferentially along its inner side, as indicated at 7 in Figs. 2 and 3, providing free ends or edges 8 and 9 which may be moved by reason of the elasticity of the material, and the tube 2 may be sprung from the mandrel. It is then desirable to vulcanize the edges 8 and 9 to form a circumferential joint or union, rendering the tube air-tight, but before vulcanizing these edges the same are moved in a direction indicated by the dotted lines and the arrows in Fig. 3 until they are brought together on the opposite side of the tread portion 3, in which latter position they are vulcanized together. (Fig. 4).

It is to be noted that in the construction of the tube 2 upon the mandrel 1 the fabric or constricting strip 4 is closely adjacent the inner surface of said tube, that is, near the mandrel. It is to be further noted that when the severed edges 8 and 9 are brought together upon the opposite side of the tread portion from that upon which they were originally formed, the fabric or constricting strip 4 is adjacent the outer surfaces of the tube 2, and that the dense portion 10 of the tread portion 3 is between said fabric and the space provided for inflation. By uniting the severed ends 8 and 9 on the reverse side of the tread, as has been described, the circumference of what was formerly the outer surface of the tread at a point 11 is materially reduced, for the reason that the fabric 4 has slight yield and retains substantially its original circumference throughout the entire operation heretofore described. The reduced circumference compelled by the union of the severed edges finds its compensation in a compression of the rubber, it being obvious of course that the greater compression occurs within the scope of the most reduced circumference and progressively depreciates toward the fabric 4. It will be apparent that while a certain amount of longitudinal or peripheral compression or constriction occurs by reason of the conditions previously set forth, a much greater amount of transverse compression or constriction of the tread portion takes place by reason of the material change in shape and transverse circumference of the dense portion 10 of the tread. A tire is therefore provided wherein both transverse and longitudinal or peripheral compression are secured, rendering the same proof against puncture to a much higher degree than a tire which has only one of these features.

By making the tube on a circular endless mandrel and then severing the tube and bringing the ends together as has been described, a much more perfect tread is secured, there being no transverse joint on the tube. The tube may also be built practically the full size of the opening in the shoe to which it is to be fitted, for the reason that it is adapted to substantially conform with this opening and has no slack portions to be filled out upon inflation, as in the case of a tube built upon a straight mandrel, or upon any other mandrel which does not conform to the shape of the opening in the shoe. This avoids the necessity of stretching, and consequently results in a much longer life of the tube. It not being necessary to stretch the same to any substantial degree, and the annular continuous fabric strip 4 being embedded within said tube to prevent stretching, it is found that the tube may be removed from the shoe at any time, and when it is desired to restore said tube to the shoe the operator will not be confronted with a surplus of inner tube. By this invention a tube is constructed which may be taken out and restored at will.

If there is any tendency for the fabric strip 4 to separate or become loosened from the tube 2, this tendency will have its greatest effect adjacent the annular edges 12 and 13 of said strip, and to minimize the possibility of separation at these edges is the function of the strain resisting members 5 and 6. These members are preferably in the form of an annular strip of substantially firm rubber, and in cross section are tapered from a wide portion at the center to a comparatively narrow edge on each side of the center. The edges 12 and 13 of the fabric strip 4 are embedded within these rubber strips and extend about half way through the latter terminating opposite the wide cross sectional dimension of the same. The edges of the fabric are secured to this rubber strip preferably by frictionizing, that is by fusing the rubber of the strips into the pores and weavings of the fabric, providing an eminently strong and lasting union. The strain resisting strips 5 and 6 are, of course, vulcanized with and form part of the finished tube, and these strips being of firmer rubber than that used for the remainder of the tube provide such a union with the fabric strip 4 that if there is any tendency for the fabric to tear away from the tube 2 the separation is resisted both by the shape of these members, and by their vulcanized association with the tube. To provide a strong joint between the fabric and the tube, especially along the edges of the fabric, is important, inasmuch as if the fabric becomes loosened from the tube, the constricting effect of said strip is partially or wholly destroyed. Another advantage of a longitudinal peripheral union, such as has been described, over a transverse union is that the strain brought about by the contact of the tire with the road is parallel with the line of union rather than at right angles thereto. In the latter case all of said strain is tending directly to tear the joint apart. In the former case the joint or seam is longitudinal of the direction of strain and obviously not affected thereby.

Referring to Fig. 5 of the drawings, the tube 2 is shown as inflated in its position within the shoe 14 and the transverse constricting effect hereinbefore described will be apparent from this figure. It will be noted that the fabric is brought up on either side of the center of the tube to a point where there is very little wear, thereby doing away to a certain extent with the possibility of the edges of the fabric separating from the tube.

By employing a medium of rubber and frictionizing the same with the fabric and then vulcanizing the same with the tube the whole is practically fused or hermetically joined, and the possibility of separation is reduced to a minimum if not absolutely obviated.

It will be apparent from the foregoing that a tube or tire is provided which secures, among others, all the objects and advantages set forth.

As many changes could be made in carrying out the above method without departing from the scope of the invention, it is intended that all matter contained in the above description shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. The method of making tires consisting of forming a continuous hollow resilient tube on a mandrel, applying a strip of fabric to the portion of said tube designed to be the tread, severing the tube peripherally opposite said portion to remove said tube from the mandrel, and uniting the severed edges on the reverse side of said tread portion to cause constriction of the material in said tread.

2. The method of making tires consisting of forming a continuous hollow resilient tube on a mandrel, applying a strip of fabric to the portion of said tube designed to be the tread, severing the tube peripherally opposite said portion to remove said tube from the mandrel, and uniting the severed edges on the reverse side of said tread portion to cause constriction of the material in said tread in a transverse and longitudinal direction.

3. The method of making tires consisting of forming a continuous hollow rubber tube on a mandrel, applying a strip of fabric to the portion of said tube designed to be the tread leaving a portion of unrestrained rubber, severing the tube peripherally through said unrestrained rubber to remove said tube from the mandrel, and uniting the severed edges on the reverse side of said tread to cause constriction of the rubber therein.

4. The method of making tires consisting of forming a continuous hollow rubber tube on a mandrel, applying a strip of fabric to the portion of said tube designed to be the tread leaving a portion of unrestrained rubber, severing the tube peripherally through said unrestrained rubber to remove said tube from the mandrel, reversing the tube bringing the tread portion facing circumferentially inward, and uniting the severed edges on the inner side of said tread portion to cause constriction of the rubber therein.

5. The method of making tires consisting of forming a continuous hollow rubber tube on a mandrel, applying a strip of fabric to the portion of said tube designed to be the tread leaving a portion of unrestrained rubber, severing the tube peripherally through said unrestrained rubber to remove said tube from the mandrel, reversing the tube bringing the tread portion facing circumferentially inward, and uniting the severed edges on the inner side of said tread portion to cause transverse and longitudinal constriction of the rubber therein.

6. The method of making tires consisting of forming a continuous hollow resilient tube on a mandrel, applying a strip of fabric having its edges firmly embedded in retaining portions to the portion of said tube designed to be the tread, severing the tube peripherally away from said fabric to remove the tube from the mandrel, and uniting the severed edges on the reverse side of said tread to cause constriction of the rubber therein.

7. The method of making tires consisting of securing a strip of rubber to opposite edges of an annular strip of fabric and vulcanizing said rubber strips with the rubber of a tube to obtain a firm union between said fabric and said tube.

8. The method of making tires consisting of frictioninzing a strip of rubber to opposite edges of an annular strip of fabric and vulcanizing said rubber strips with the rubber of a tube to obtain a firm union between said fabric and said tube.

9. The method of making tires which consists in embedding a portion of fabric in a portion of substantially firm rubber and vulcanizing said rubber portion with the rubber of a tube, said firm rubber portion being wedge shaped and tapering in the direction of stress to prevent displacement of the fabric.

10. The method of making tires which consists in applying fabric to the tread portion of a hollow resilient tube, slitting the tube longitudinally, bending the resultant slitted tube so as to cause the edges of the slit to approach each other on the opposite side of the tread portion, and maintaining said edges in the last-mentioned position.

11. The method of making tires which consists in applying fabric to the tread portion of a hollow resilient continuous tube, slitting the tube longitudinally, bending the resultant slitted tube so as to cause the edges of the slit to approach each other on the opposite side of the tread portion, and maintaining said edges in the last-mentioned position.

12. The method of making tires which consists in applying fabric to the tread portion of a hollow resilient tube, slitting the tube longitudinally, bending the resultant slitted tube so as to cause the edges of the slit to join on the opposite side of the tread portion, and maintaining said edges in the last-mentioned position.

13. The method of making tires which consists in applying fabric to the tread portion of a hollow resilient continuous tube, slitting the tube longitudinally, bending the resultant slitted tube so as to cause the edges of the slit to join on the opposite side of the tread portion, and maintaining said edges in the last-mentioned position.

14. The method of making tires which consists in applying non-elastic fabric to the tread portion of a hollow resilient continuous tube, slitting the tube longitudinally, bending the resultant slitted tube so as to cause the edges of the slit to approach each other on the opposite side of the tread portion, and maintaining said edges in the last-mentioned position.

In testimony whereof I affix my signature, in the presence of two witnesses.

IRA J. WEBSTER.

Witnesses:
  ROBERT D. TRASK,
  JAMES J. MCVEY.